United States Patent [19]

Boschen

[11] 4,205,712
[45] Jun. 3, 1980

[54] METHOD AND MACHINE FOR HARVESTING AND DE-LIMBING TREES

[76] Inventor: Graeme M. Boschen, 10 Browns Rd., Gympie, Queensland, 4570, Australia

[21] Appl. No.: 947,100

[22] Filed: Sep. 29, 1978

[30] Foreign Application Priority Data

May 15, 1978 [AU] Australia ............................. PD4402
Aug. 16, 1978 [AU] Australia ............................. PD5530

[51] Int. Cl.² .......................... A01G 23/08; B27L 1/00
[52] U.S. Cl. ............................. 144/2 Z; 144/309 AC
[58] Field of Search ................... 144/2 Z, 3 D, 34 R, 144/34 A, 34 E, 309 AC

[56] References Cited

U.S. PATENT DOCUMENTS

| | | | |
|---|---|---|---|
| 3,239,082 | 3/1966 | Herolf | 144/2 Z |
| 3,805,858 | 4/1974 | Morin | 144/2 Z |
| 3,889,729 | 6/1975 | Pinomaki | 144/2 Z |
| 4,010,782 | 3/1977 | Moisander | 144/2 Z |
| 4,034,785 | 7/1977 | Tucek | 144/2 Z |
| 4,067,367 | 1/1978 | Adamson | 144/2 Z |
| 4,114,666 | 9/1978 | Bruun | 144/2 Z |
| 4,124,047 | 11/1978 | Dressler et al. | 144/2 Z |

FOREIGN PATENT DOCUMENTS

| | | | |
|---|---|---|---|
| 843197 | 6/1970 | Canada | 144/2 Z |
| 281064 | 12/1970 | U.S.S.R. | 144/3 D |
| 313671 | 12/1971 | U.S.S.R. | 144/2 Z |

*Primary Examiner*—Robert Louis Spruill
*Assistant Examiner*—W. D. Bray
*Attorney, Agent, or Firm*—Schwartz, Jeffery, Schwaab, Mack, Blumenthal & Koch

[57] ABSTRACT

A method of harvesting and de-limbing trees using a feller-buncher and a de-limbing machine where the trees are fed through encircling de-limbing members on the de-limbing machine as the feller-buncher and de-limbing machine are brought together. A de-limbing machine for the above method includes fixed and movable de-limbing members on a mobile frame. A secondary de-limber and a pick-up arm may also be provided on the de-limbing machine.

6 Claims, 5 Drawing Figures

METHOD AND MACHINE FOR HARVESTING AND DE-LIMBING TREES

BACKGROUND OF THE INVENTION (1) Field of the Invention

This invention relates to the harvesting and de-limbing of trees.

(2) Description of the Prior Art

A well-known machine known as a "feller-buncher" is capable of severing tree trunks near to ground level, and for transporting the trees, holding them firmly at or near to their lower ends. It has been customary for such a machine to be used to place a number of such trees with their trunks more or less parallel and close together, and for de-limbing then to be carried out e.g. using a multiple-tooth jaw-type de-limber or a gate de-limber. This procedure involved a considerable amount of time and labour in transporting the trees and in de-limbing them.

To avoid the problem of having to transport the felled trees to the de-limber, combined felling and de-limbing machines were developed. These machines have two major problems. Firstly, they can only de-limb one tree at a time. Secondly, they are extremely expensive and inflexible and are not particularly suitable for the small forestry contractor.

BRIEF SUMMARY OF THE INVENTION

One of the main objects of the present invention is to provide a method of de-limbing a tree immediately after it is felled and is still held by the feller-buncher.

Another of the principal objects of the invention is to provide a de-limbing machine by means of which this method may be quickly, conveniently and economically carried out.

With the foregoing and other objects in view, the invention resides broadly, in one aspect, in a method of harvesting and de-limbing trees including the steps of:

(a) felling a tree by a feller-buncher;

(b) turning the tree while still held by the feller-buncher to a substantially horizontal position to engage the tree, near the tree top, within de-limbing members of a de-limbing machine;

(c) moving a movable de-limbing member of said de-limbing members to a closed position; and (d) moving the de-limbing machine and feller-buncher relatively closer to cause the tree to be forced between the de-limbing members and to be delimbed thereby.

In another apsect, the invention resides broadly in a de-limbing machine including:

a mobile frame;

at least one fixed de-limbing member and at least one movable de-limbing member on the frame;

means for moving the movable de-limbing member to an open position, to enable a substantially horizontal trunk of a tree to be placed and engaged, near to the tree-top, between the fixed and movable de-limbing members, or to a closed position, the fixed and movable de-limbing members then encircling the engaged part of the tree trunk;

the fixed and movable de-limbing members being adapted, when the tree trunk is forced, butt end last, through the encircling de-limbing members, to detach the limbs from the trunk.

BRIEF DESCRIPTION OF THE DRAWINGS

In order that the invention may be readily understood and carried into practical effect, reference is now made to the accompanying drawings, wherein.

DETAILED DESCRIPTION OF THE PREFERRED EMBODIMENTS

Figure 1:
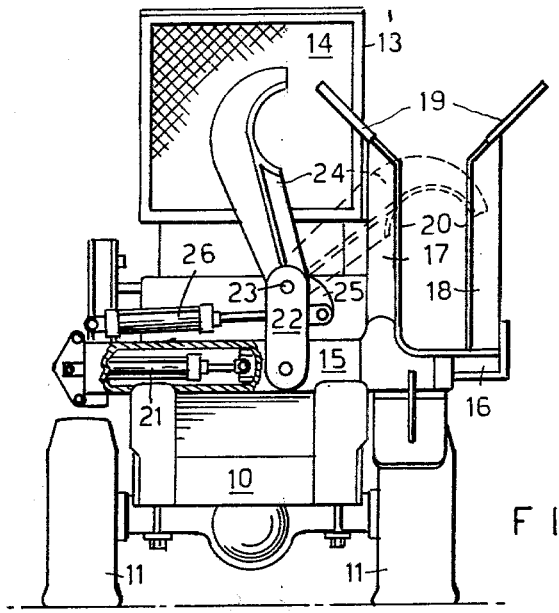
FIG. 1 is a partly broken-away front elevational view of a de-limbing machine according to one embodiment of the invention.

The de-limbing machine includes a main frame 10 mounted on four wheels 11 driven from an engine within an engine housing 12 behind a driver's cabin 13 which is shielded by mesh panels 14.

A sturdy transverse box-section bolster 15 is mounted in front of the main frame 10, and a sliding beam 16 is telescopically engaged in the bolster and extends from one side of it. Two spaced upright side bars 17 and 18 are provided at one side of the machine, the side bar 17 being rigidly mounted at one side of the bolster 15, the other side bar 18 being rigidly fixed on the outer end of the sliding beam 16. Downwardly convergent guides 19 are secured to the oblique upper ends of the side bars 17 and 18, and wear plates 20 are secured to the near sides of these bars. The sliding beam 16 may be advanced or retracted by a hydraulic cylinder 21, to bring the movable side bar 18 further from, or closer to, the fixed side bar 17.

A pair of bearing brackets 22 secured to the front and rear of the bolster 15 are formed with bearings for a shaft 23 on which is mounted a top bar 24 and also an actuating lever 25 connected to the top bar for oscillation therewith. A hydraulic cylinder 26 operatively connected to the actuating lever 25 may have its piston extended or retracted to swing the top bar 24 up to open or inoperative position, as shown in full lines in FIGS. 1 and 2, or down to closed or operative position, as indicated in broken lines in FIG. 1.

Figure 3:
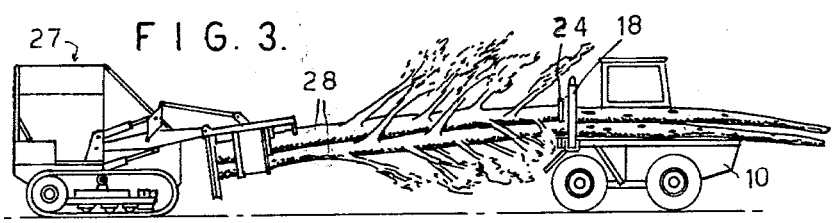
FIG. 3 is a side view, to reduced scale, of the de-limbing machine being used in conjunction with a feller-buncher for carrying out the de-limbing method according to the invention.

In use, a feller-buncher, as indicated at 27 in FIG. 3, which has felled two trees 28 and holds them near to their butts, brings the two adjacent trunks down towards horizontal, so that the two trees, near to their tops, are brought down between the side bars 17 and 18 of the de-limbing machine. The operator of the de-limiting machine adjusts the spacing between the side bars 17 and 18 as may be required, and brings the top bar 24 down on the two superimposed trees. The de-limbing machine is then advanced towards the feller-buncher 27, and the side bars 17 and 18 and the top bar 24 remove the limbs frpm the two trees in one pass. The de-limber machine is then reversed, the top bar 24 being raised and the movable side bar 18 being moved further from the fixed side bar 17, so that the operator of the feller-buncher can deposit the de-limbed (but untopped) trees on the ground and fell two more trees, and so on. Eight to twelve of the de-limbed trees are ordinarily placed in a bundle in this way, after which they may all be topped by a chain-saw operator, and then may be cross-cut to standard lengths for removal by a forwarder.

While the above method and apparatus are generally satisfactory in most practical applications, experience has shown that when de-limbing several trees at once which are of different lengths, the limbs are left on the longer trees. To overcome this problem, a secondary de-limber is provided at a distance e.g. 1–2 meters, behind the fixed and movable de-limbing member.

Figure 2:
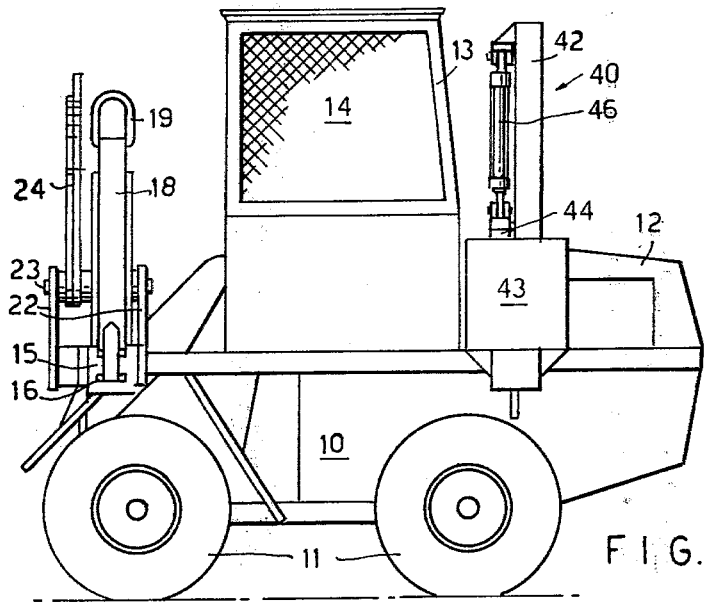
FIG. 2 is a side elevational view of the de-limbing machine.
Figure 4:
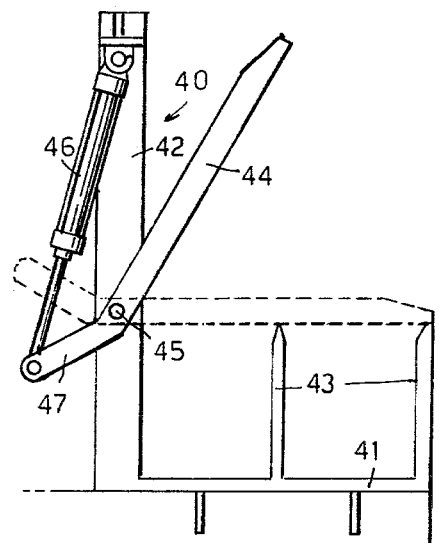
FIG. 4 is a front view of the secondary de-limber fitted to the de-limbing machine of FIG. 2.

Referring to FIGS. 2 and 4, secondary de-limber 40 has its base 41 bolted to the main frame 10 of the de-limbing machine at a distance of 1–2 meters from the primary de-limber. A main vertical post 42 is fixed to one side of the base 41. Three vertical plates 43 are fixed to the base 41 at equally spaced intervals across the base, the plates 43 running parallel to the axis of the machine.

Arm 44 is rotatably mounted on the post 42 via pin 45. The arm 44 is rotatable between the vertical position (not shown) through an intermediate position (shown in full lines) to the horizontal (or working) position (shown in dashed lines). Rotation of the arm 44 is controlled by a double-acting hydraulic cylinder 46, mounted adjacent the top of post 42 and connected to an angled extension 47 on the arm 44.

In use, a feller-buncher, as indicated at 27 in FIG. 3, which has felled two trees 28 and holds them near to their butts, brings the two adjacent trunks down towards horizontal, so that the two trees are brought down between the side bars 17 and 18 of the primary de-limbing machine with their tops between the vertical plates 43 of the secondary de-limber. The operator of the de-limbing machine adjusts the spacing between the side bars 17 and 18 as may be required, and brings the top bar 24 and arm 44 down on the two superimposed trees. The de-limbing machine is then advanced towards the feller-buncher 27, and the side bars 17 and 18 and the top bar 24 remove the lower limbs from the two trees in one pass while vertical plates 43 and arm 44 remove the upper limbs. The de-limber machine is then reversed, the top bar 24 and arm 44 being raised and the movable side bar 18 being moved further from the fixed side bar 17, so that the operator of the feller-buncher can deposit the de-limbed (but untopped) trees on the ground and fell two more trees, and so on. Eight to twelve of the de-limbed trees are ordinarily placed in a bundle in this way, after which they may all be topped by a chain-saw operator, and then may be cross-cut to standard lengths for removal by a forwarder.

When the trees are of different length, the primary de-limber will remove all the limbs of one tree and the lower limbs of the other tree, while the secondary de-limber will remove the upper limbs of the second tree.

Figure 5:
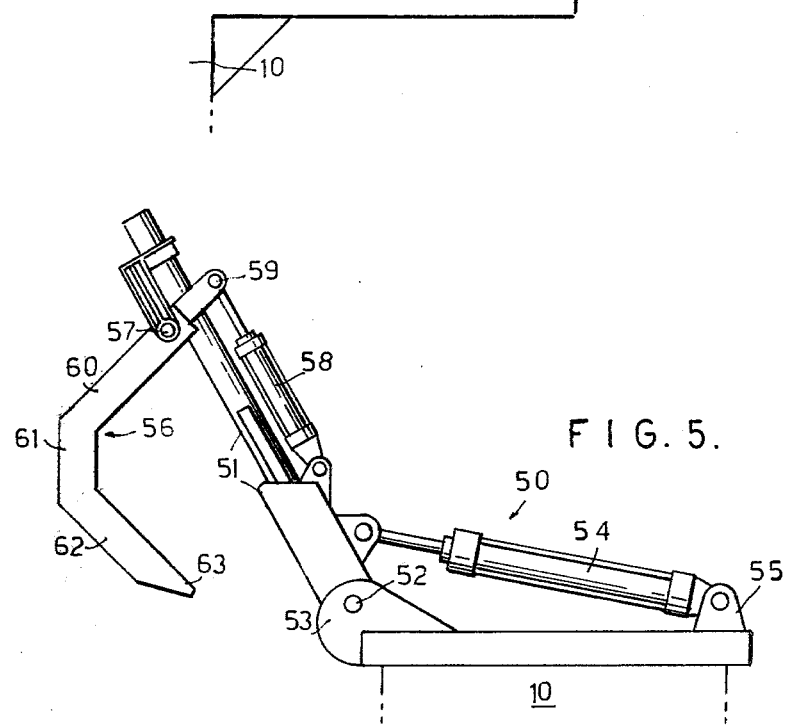
FIG. 5 is a rear view of the pick-up arm fitted to the de-limbing machine in a second embodiment.

In a second embodiment, the secondary de-limber is replaced by a pick-up arm (see FIG. 5).

Referring to FIG. 5, the pick-up arm assembly 50 is mounted on frame 10 of the de-limbing machine behind the driver's cabin 13.

Boom 51 is pivotally mounted on a horizontal pin 52 fixed between spaced vertical plates 53 welded or bolted to the frame 10.

A hydraulic ram 54 is connected intermediate the length of the boom 51 and is mounted on an upstanding base 55 also bolted or welded to the frame 10. Extension and retraction of the ram 54 controls the angular height of the boom.

A substantially L-shaped jib 56 is pivotally mounted at one end to the free end of the boom via horizontal pin 57 fixed in the boom.

Hydraulic ram 58 is mounted on the boom 51 and has its piston rod pivotally connected to an extension 59 on the jib 56.

The jib 56 has an inner section 60, a short intermediate section 61 angled thereto, and an outer section 62 angled to intermediate section 61 to give jib 56 a substantially L-shape when viewed from the rear. Outer section 62 terminates in a foot 63.

In use, a feller-buncher, as indicated at 27 in FIG. 3, which has felled two trees 38 and holds them near to their butts, brings the two adjacent trunks down towards horizontal, so that the two trees, near to their tops, are brought down between the side bars 17 and 18 of the de-limbing machine. The operator of the de-limbing machine adjusts the spacing between the side bars 17 and 18 as may be required, and brings the top bar 24 down on the two superimposed trees. The de-limbing machine is then advanced towards the feller-buncher 27, and the side bars 17 and 18 and the top bar 24 remove the limbs from the two trees in one pass.

The feller-buncher 27 releases the trees 28. The butt ends of the trees 28 are supported between the side bars 17, 18 by the sliding beam 16 while the tops of the trees fall onto the ground.

The pick-up arm assembly is operated by extending ram 54 to lower the boom 51 to a substantially horizontal position.

Ram 58 is then extended to pivot jib 56 inwardly towards the machine. The foot 63 moves under the trees and continued movement of the jib 56 results in the trees being cradled by the jib 56 adjacent the intermediate section 61 thereof.

Boom 51 is raised by retracting the ram 54 and the trees are lifted clear of the ground and so may be transported to a suitable site by the de-limbing machine.

The de-limbing methods, the apparatus for these purposes, will be found to be very effective in achieving the objects for which they have been devised.

It will, of course, be understood that many modifications of constructional detail and design, which will be readily apparent to persons skilled in the art, may be made to the embodiment of the apparatus described and illustrated without departing from the scope of the present invention as claimed.

I claim:

1. A method of harvesting and de-limbing trees including the steps of:
    (a) felling a tree by a feller-buncher;
    (b) turning the tree while still held by the feller-buncher to a substantially horizontal position to engage the tree, near the tree-top, within de-limbing members of a de-limbing machine;
    (c) moving a movable de-limbing member of said de-limbing members to a closed position; and
    (d) moving the de-limbing machine and feller-buncher relatively closer to cause the tree to be forced between the de-limbing members and to be delimbed thereby.

2. A method as claimed in claim 1, and further including the steps of:
    (e) forcing the tree through a secondary de-limber spaced behind said de-limbing members.

3. A method as claimed in claim 1 and including the further steps of:

(f) supporting the butt end of the tree with said de-limbing members;
(g) releasing the tree from the feller-buncher to allow the tree top to fall to the ground; and
(h) lifting the tree to a substantially horizontal position with a pick-up arm mounted on the de-limbing machine spaced behind said de-limbing members.

4. A method of harvesting and de-limbing trees including the steps of:
(a) felling a tree by a feller-buncher;
(b) turning the tree while still held by a feller-buncher to a substantially horizontal position to engage the tree, near the tree-top, within de-limbing members of a de-limbing machine;
(c) moving a movable de-limbing member of said de-limbing members to a closed position;
(d) moving the de-limbing machine and feller-buncher relatively closer to cause the tree to be forced between the de-limbing members and to be delimbed thereby;
(e) supporting the butt end of the tree with said de-limbing members;
(f) releasing the tree from the feller-buncher to allow the tree top to fall the ground; and
(g) lifting the tree to a substantially horizontal position with a pick-up arm mounted on the de-limbing machine spaced behind said de-limbing members.

5. A de-limbing machine including:
a mobile frame;
at least one fixed de-limbing member on said frame comprising a transverse bottom member and a first upright side member secured to the bottom member;
a sliding beam telescopically slidably engaged with said bottom member;
at least one movable de-limbing member comprising a second upright side member secured to said beam, and a top arm pivoted to said frame;
means for moving said movable de-limbing member to an open position to enable a substantially horizontal trunk of a tree to be placed and engaged near to the tree-top between said fixed and movable de-limbing members, or to a closed position wherein said fixed and movable de-limbing members encircle the engaged part of the tree trunk;
said fixed and movable de-limbing members being adapted, when the tree trunk is forced, butt end last, through the encircling de-limbing members, to detach the limbs from the trunk.

6. A de-limbing machine including:
a mobile frame;
at least one fixed de-limbing member and at least one movable de-limbing member on said frame;
means for moving said movable de-limbing member to an open position to enable a substantially horizontal trunk of a tree to be placed and engaged near to the tree-top between the fixed and movable de-limbing members, or to a closed position wherein said fixed and movable de-limbing members encircle the engaged part of the tree trunk;
a secondary de-limber mounted on said mobile frame and spaced from said fixed and movable de-limiting members;
said secondary de-limber including at least two spaced vertical members mounted on the frame, an arm pivotally mounted on one of said vertical members, and means for moving said arm to an open position to enable a substantially horizontal trunk of a tree to be placed between and engaged by the vertical members, or to a closed position wherein said vertical members and the arm encircle the engaged part of the tree, said fixed and movable de-limbing members and said vertical members and arm being adapted, when the tree trunk is forced therethrough, to detach the limbs from the tree.

* * * * *